United States Patent [19]
Breeden

[11] 3,751,602
[45] Aug. 7, 1973

[54] LOUDSPEAKING TELEPHONE

[75] Inventor: Robert Louis Breeden, Carmel, Ind.

[73] Assignee: Bell Telephone Laboratories, Incorporated, Murray Hill, Berkeley Heights, N.J.

[22] Filed: Aug. 13, 1971

[21] Appl. No.: 171,550

[52] U.S. Cl. .............................. 179/81 B, 179/1 HF
[51] Int. Cl. .............................................. H04m 1/60
[58] Field of Search ............ 179/81 B, 1 HF, 170.6, 179/170.8

[56] References Cited

UNITED STATES PATENTS

| | | | |
|---|---|---|---|
| 3,562,791 | 2/1971 | Baker | 179/81 B |
| 3,610,835 | 10/1971 | Reid | 179/81 B |
| 3,395,255 | 7/1968 | Clement | 179/81 B |

*Primary Examiner*—Kathleen H. Claffy
*Assistant Examiner*—Kenneth D. Baugh
*Attorney*—W. L. Keefauver et al.

[57] ABSTRACT

In a loudspeaking telephone employing a control circuit to achieve complementary switched gain in the transmit and receive channels, the timing means associated with the gain switching provides for a fixed relatively fast attack time and a variable or adaptive release time dependent upon the presence or absence of speech signals in the receive channel when a transmit speech signal terminates. Improved mode transition and particularly effective talk-down action results.

6 Claims, 6 Drawing Figures

LOUDSPEAKING TELEPHONE

BACKGROUND OF THE INVENTION

1. Field of the Invention

This invention relates to loudspeaking telephones and more particularly to the means for controlling the transmit-receive modes of such telephones.

2. Description of the Prior Art

As shown, for example, by W. F. Clemency in U.S. Pat. No. 3,046,354 issued July 24, 1962, conventional practice in loudspeaking telephones, also commonly termed speakerphones, calls for separate transmit and receive paths, each connected to the line by a common hybrid. Each path includes suitable amplification together with a respective variolosser circuit, and it is the condition of these circuits that controls whether the set operates in the transmit mode or in the receive mode. The specific means employed to control the variolossers is of course critical to the voice switching function which, in turn, determines how well the speakerphone responds to the existent input conditions.

In prior art speakerphones difficulty has been experienced with the means that are employed to enable a distant party to break in (commonly termed the talk-down function) on the local party who is transmitting.

A conventional arrangement is to employ a common variolosser circuit with inputs from the receiver input, the transmitter output and a separate noise detector circuit which comes off the transmit side of the line. The output from this variolosser, if any, is then applied to the transmit and receive variolossers to increase attenuation in the transmit path and to reduce attenuation in the receive path, assuming that talk-down action is called for. In such systems, however, it is common for undue delays to occur before talk-down is achieved, which tends to diminish the attractiveness of "hands-free" or speakerphone telephony in that conversational interchanges seem to fall somewhat short of being fully natural. Initial clipping during the talk-down process also contributes to the lack of naturalness.

Accordingly, a general object of the invention is to improve the effectiveness of voice switching in speakerphone sets and particularly to improve the responsiveness of such sets to a talk-down condition.

SUMMARY OF THE INVENTION

The stated object and additional objects are achieved in accordance with the principles of the invention by a control circuit employing three input branches or sections, namely, a transmit section, a noise section and a switchguard section. A first amplifier common to the transmit and noise sections applies signals thereto from the transmit side of the line while a single amplifier is used to apply signals from the receive side of the line to the switchguard section. In accordance with the invention the input to the switchguard amplifier is the output of a linear adder circuit which combines inputs from both sides of an amplifier on the receive side of the line. Signals in each of the three sections indicated are rectified and applied to a comparator circuit. The comparator output, applied by way of a transmit switch or a talk-down switch, conditions the transmit and receive variolosser circuits to control the operating mode of the set in accordance with the relative level of the comparator inputs. Whenever the noise rectifier output to the comparator exceeds the transmitter rectifier output, the system is prevented from switching to the transmit mode. The result is a significant improvement in both mode transition and overall intelligibility.

In accordance with one aspect of the invention the switching times of the comparator are controlled in a unique manner by the transmit and talk-down switches. A fast attack time (receive to transmit) is set by the transmit switch in order to avoid initial clipping of the transmit signal. The release time (transmit to receive) is made variable or adaptive, however, as established by an interaction between the transmit and talk-down switches. Specifically, when the transmit signal ceases, if there is no receive signal, the transmit switch provides a slow release time and the system is held in the transmit mode during relatively short speech pauses in order to avoid choppiness in transmit speech. If a receive signal is present when the transmit signal ceases, however, the talk-down switch produces a fast release time so that initial clipping of the receive speech signal is avoided. In short, release time duration is tailored, in accordance with the invention, to meet the actual conditions existing at the time that the transmit-to-receive switching function is to be effected.

DETAILED DESCRIPTION

General

Figure 1:
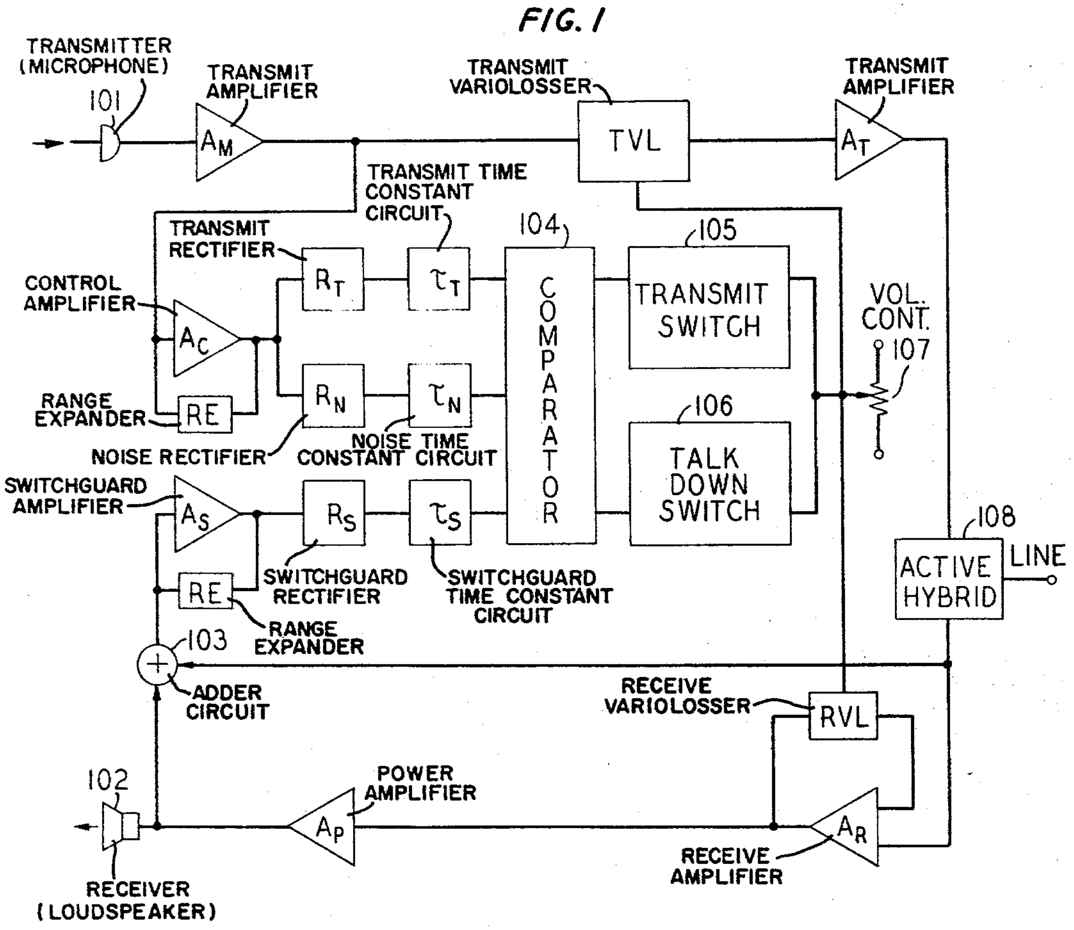
FIG. 1 is a block diagram of a speakerphone circuit in accordance with the invention.

As shown in FIG. 1, a speakerphone sytem in accordance with the invention employs two major circuit groups: one, an audio loop, and the second, a control circuit. The audio loop is in turn made up of a transmit channel which includes a transmitter 101, a microphone preamplifier $A_M$, a transmit variolosser circuit TVL and a transmit amplifier $A_T$. The receive channel includes a receiver 102, a power amplifier $A_P$, a receive amplifier $A_R$ and a receive variolosser RVL which is connected in the feedback loop of the receive amplifier $A_R$. The two channels described are coupled to the telephone line through an active hybrid circuit 108. The receive channel provides the necessary gain between the line and the receiver or loudspeaker 102 and, similarly, the transmit channel provides the necessary gain between the transmitter or microphone 101 and the line.

Basic Operation

The combination of the gain in each channel, the coupling between the channels across the hybrid 108 and the acoustic coupling between the loudspeaker 102 and the microphone 101 results in a loop gain greater than unity. Accordingly, in order to provide for an adequate margin against the development of a singing condition, it is necessary to switch gain between the two audio channels. In operation, the system normally resides in the receive mode, which means that the receive channel has full gain and the transmit channel has reduced gain. When speech appears in the transmit channel, the system switches to the transmit mode, in which case the transmit channel has full gain and the receive channel has reduced gain. The loop gain must always remain less than unity, however, which, in accordance with the invention, requires that the gain switched in the transmit and receive channels be complementary. This requirement is met by using substantially identical variolossers TVL and RVL and, as described, by placing the receive variolosser RVL in the feedback network around the receive amplifier $A_R$.

Switching between the receive and transmit modes of the system is accomplished by the control circuit which includes a control amplifier $A_C$, a switchguard amplifier $A_S$, rectifier circuits $R_T$, $R_N$ and $R_S$, time constant circuits $T_T$, $T_N$ and $T_S$, a comparator 104 a transmit switch 105 and a talk-down switch 106.

Circuit Details

Figure 2:
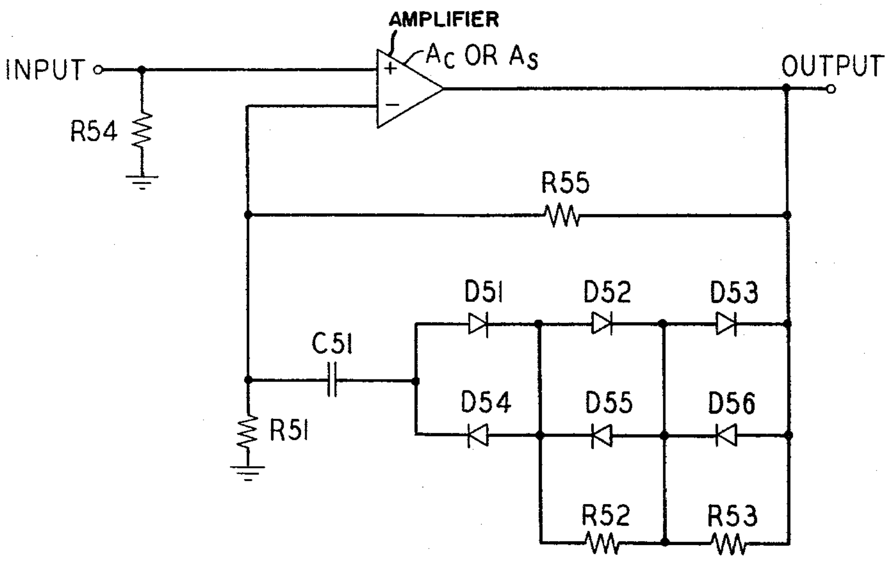
FIG. 2 is a schematic circuit diagram of the feedback circuit of the control and switchguard amplifiers shown in FIG. 1.

Each of the amplifiers shown in FIG. 1 is an operational amplifier, preferably of a type which may be fabricated in integrated circuit form. The microphone amplifier $A_M$ is designed in one embodiment with a 6 db base boost from 500 Hz to 3 kHz in order to provide the desired frequency response in the transmit channel. The transmit amplifier $A_T$ and the power amplifier $A_P$ are both designed with flat gain in the audio band. Both the control amplifier $A_C$ and the switchguard amplifier $A_S$, a part of the control circuitry to be described subsequently, have identical nonlinear gain characteristics. In these latter two amplifiers a two-to-one logarithmic compression of input to output signals is obtained with the diode and resistor array shown in FIG. 2 which includes diodes D51 through D56 together with resistors R51, R52, R53 and R55. The compression characteristics of the control and switchguard amplifiers $A_C$ and $A_S$ permit a relatively low transmit threshold so that low level transmit signals will switch the system and, additionally, so that the amplifiers will not produce a lockout as the result of overloading.

The receive amplifier $A_R$ employs the receive variolosser RVL in its feedback path in accordance with the invention in order to provide a variable gain. In this way, the receive channel gain varies inversely with the transmit channel gain although the transmit and receive variolossers are identical. By employing identical variolossers in accordance with the invention and, additionally, by fabricating them on a common silicon chip, excellent tracking of gains in both the transmit and receive channels is automaticaly ensured.

The two variolossers TVL and RVL may be substantially conventional and may, for example, be similar to those shown in the Clemency patent cited above.

Figure 3A:
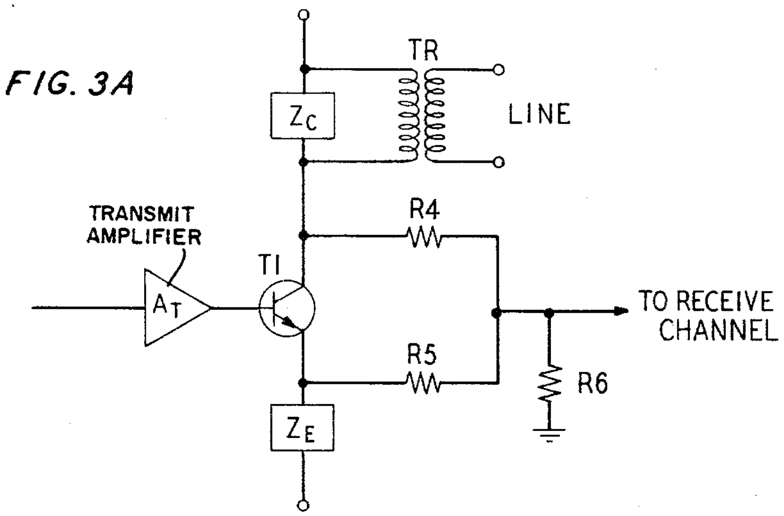
FIG. 3A is a schematic circuit diagram, partially in block form of the hybrid circuit of FIG. 1.
Figure 3B:
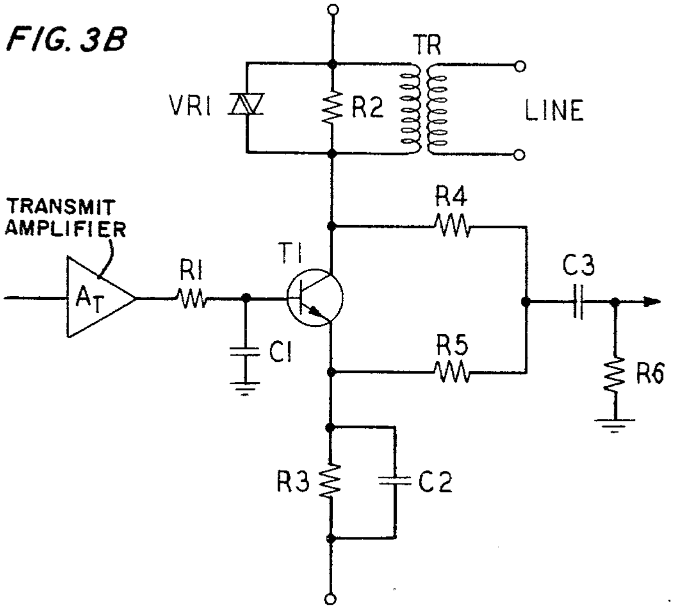
FIG. 3B is a complete schematic circuit diagram of the circuit of FIG. 3A.

The active hybrid circuit 108 may take the form shown in FIGS. 3A and 3B, FIG. 3A being in partial block form and FIG. 3B being in circuit schematic form. A single transistor T1 is employed in circuit combination with normally equal impedances in the collector circuit and in the emitter circuit. With the impedance $Z_C$ in parallel with the secondary of the line transformer TR, equal out-of-phase signals are produced on the collector and emitter electrodes. This arrangement produces unity gain from the transmit amplifier $A_T$ to the telephone line and isolates the transmit and receive channels. In the circuit schematic of FIG. 3B, the impedance $Z_C$ is shown to include a resistor R2 and a varistor VR1 which provides peak limiting, while the impedance $Z_E$ is made up of a capacitor C2 and a resistor R3 which provides the necessary impedance matching. Conventional shaping is effected in the base circuit or transmit branch by resistor R1 and capacitor C1 and in the receive branch by capacitor C3 and resistor R6. The magnitudes of resistors R4 and R5 are equal to provide the necessary balance.

Each of the control circuit rectifiers $R_T$, $R_N$ and $R_S$, employs a respective low threshold voltage doubling diode arrangement, all three preferably being combined in a common silicon integrated circuit. A low operating threshold for the rectifiers may advantageously be obtained by a circuit which biases the diodes with a small amount of forward current. Alternatively, other low threshold rectifiers of conventional form may be employed. The time constant circuits $T_T$, $T_N$ and $T_S$, which may in fact be included as integral parts of the rectifier circuits or of the comparator circuit, provide for suitable attack and release times in a manner described subsequently in greater detail.

The comparator 104 may be substantially conventional and may, for example, be in the form of a differential three-input integrated circuit designed to determine the relative magnitude of the three inputs. Two outputs corresponding to the transmit and switchguard inputs become the inputs for the transmit switch 105 and the talk-down switch 106. These switches in combination with the comparator 104 operate to control the mode signal that is applied to the variolossers. In one embodiment of the invention, each of the two switches 105 and 106 is in the form of a simple high gain amplifier which is either turned off or operated in a fully saturated condition.

Whenever less than maximum receive channel gain is required, less loss needs to be switched by the variolossers to maintain loop sing margin. Moreover, as less loss is switched, the objections to voice switching are decreased. Accordingly, volume adjustment is provided so that the maximum loss of the variolossers TVL and RVL may be selectively reduced. This reduction is accomplished by a volume control 107 which limits the output range of the transmit and talk-down switches 105 and 106.

Control Circuit Operation

In a theoretical or ideal speakerphone designed to simulate face-to-face communication, there would, of course, be no need for switching gain in the audio loop. In any practical system, however, switched gain is necessary for the reasons described above and it is desirable that this function be performed as smoothly as possible. Gain switching is performed by the control circuit which as previously indicated includes the control amplifier $A_C$, the switchguard amplifier $A_S$, the transmit rectifier $R_T$, the noise rectifier $R_N$, the switchguard rectifier $R_S$, the time constant circuits $T_T$, $T_N$ and $T_S$, the comparator 104 and the transmit and talk-down switches 105 and 106. In operation, the control circuit samples all signals in the audio loop, determines which mode of operation is required and switches to that mode if the system is in the opposite state. This action is accomplished by converting audio signals from the transmit and receive channels to equivalent d.c. voltages which are then compared. In this operation the proper establishment of both attack and release times is critical. Attack time is defined as the time between the beginning of a speech signal and the time at which the control circuit changes state. Similarly, release time is the time between the end of a speech signal and the time when the control circuit returns to the original state. The attack time of the control circuit is made relatively short so that initial speech clipping does not occur. Without this feature the first part of a speech signal would often be lost before the system is able to assume its proper state. Conversely, the release time of the control circuit is made sufficiently long in the absence of incoming speech signals to avoid final clipping and to maintain the system in the transmit mode during speech pauses. Final clipping is the loss of the last part of the speech signal and results in part because of the diminished energy typically present in the trailing edge of speech signals.

When a signal appears in the transmit channel at the output of the microphone preamplifier $A_M$, it is then further amplified by the control amplifier $A_C$ and the resulting signal is rectified with a designed time constant $T_T$ by a transmit rectifier $R_T$. The d.c. voltage thus developed provides one input to the d.c. level comparator 104, and if this input is larger than the other two, the comparator 104 initiates switching to the transmit state. Conversely, if either of the other inputs to the comparator is larger, the comparator maintains the receive mode.

The control circuit must recognize a receive signal and prevent the transmit channel from picking up the loudspeaker output through acoustic coupling, detecting that signal as a valid transmit signal and switching the system into the transmit mode. Therefore, when a signal appears in the receive channel, it is amplified by the switchguard amplifier $A_S$, rectified with a preselected time constant $T_S$ by the receive rectifier $R_S$ and applied as another input to the comparator 104. If the receive input is larger than the other outputs, the comparator 104 retains the system in the receive state or initiates switching into the receive state if it is in the transmit mode at that time.

Any signal appearing at the microphone 101 will produce an a.c. voltage in the transmit channel. If this signal is a relatively steady-state noise signal, however, instead of a speech signal, the resulting output from the noise rectifier $R_N$ with its built-in time constant $T_N$ is designed to hold the system in the receive mode. The primary function of the noise rectifier $R_N$ is to differentiate between steady-state signals (noise) and pulsating signals (speech) which is achieved in part by proper selection of the rectifier time constant $T_N$ as well as by proper selection of the time constants $T_T$ and $T_S$. For example, in one illustrative embodiment, the transmit rectifier $R_T$ is designed to rise to full output voltage in approximately 5 milliseconds and to decay in approximately 120 milliseconds. The noise rectifier $R_N$, however, requires approximately 4 to 5 seconds to reach full output voltage but decays within approximately 8 milliseconds. In any event, if the signal at the microphone 101 is a steady-state noise rather than speech, the noise rectifier $R_N$ output is greater than the transmit rectifier $R_T$ output as determined by the comparator 106 which prevents the system from switching to the transmit mode.

The input to the switchguard amplifier $A_S$ is derived, in accordance with the invention, from two different points and added linearly in a conventional adder circuit 103. By proper selection of the levels added to obtain the input to the switchguard amplifier $A_S$, the operation of the control circuit can be optimized to ensure fully effective interrupt capability and, consequently, enhanced naturalness in back and forth conversation. The theory supporting this arrangement is better understood when it is realized that a single input to the switchguard amplifier $A_S$ taken from the input to the receive amplifier $A_R$ results in no gain being switched into the control circuit. The result of such an arrangement would be either a risk of receive lockout (system is locked out of the receive mode) or transmit lockout (the system is locked out of the transmit mode). On the other hand, with only a single input to the switchguard amplifier $A_S$ taken from the output side of the receive amplifier $A_R$, the lockout problem would be eliminated but another equally serious disadvantage would be introduced. Specifically, if a receive signal were to appear on the line with the system in the transmit mode, the signal might be unable to produce a switchguard voltage sufficiently large to switch the system into the receive mode. Accordingly, the receive signal could not be amplified until the transmit signal ceased and the system would normally return to the receive mode. Moreover, if the gain of the switchguard amplifier $A_S$ were set sufficiently high to permit a weak receive signal to break in on a transmit signal, then when the system is in the receive mode, a weak transmit signal could not break in on a receive signal.

By using the linear adder 103 in accordance with the invention, the input to the switchguard amplifier $A_S$ is automatically controlled at the proper level to ensure switching capability in either direction. A predetermined ratio of the signals from the receive amplifier $A_R$ input and output is added to reduce the maximum switched gain into the switchguard amplifier $A_S$ to a preselected level which may, for example, be on the order of 28 db.

The rectifiers $R_T$, $R_N$ and $R_S$ are so designed in accordance with the invention that with no signal in either channel, the output from the rectifier $R_N$ is slightly larger than the outputs from the rectifiers $R_T$ and $R_S$. Accordingly, the quiescent state of the system is the receive mode.

In accordance with the invention, the attack times of the entire control system are set by the attack times of the rectifiers $R_T$, $R_N$ and $R_S$ and by the attack time of the comparator 104. The release time of the full system is in turn set by both the decay time of the rectifiers and by the release time of the comparator 104. The switching times of the comparator 104 are in turn controlled by the transmit and talk-down switches 105 and 106.

Figure 4A:
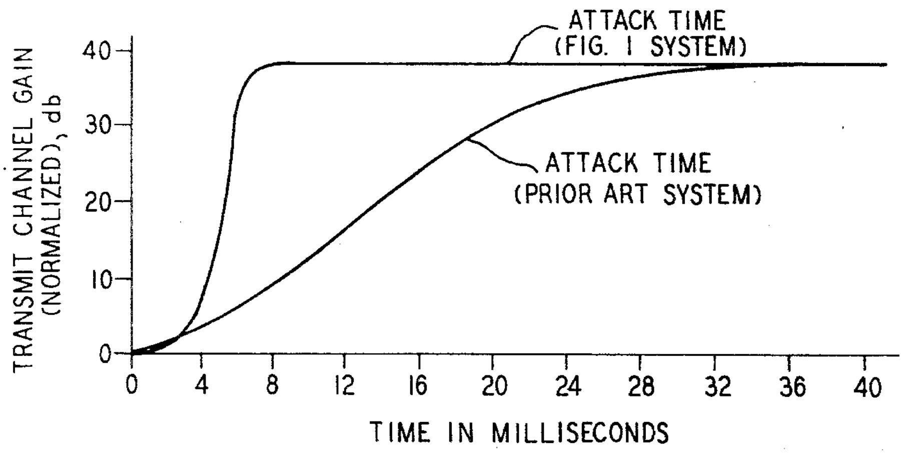
FIG. 4A is a plot of the attack time of the system of FIG. 1 compared to the attack time of a prior art system.
Figure 4B:
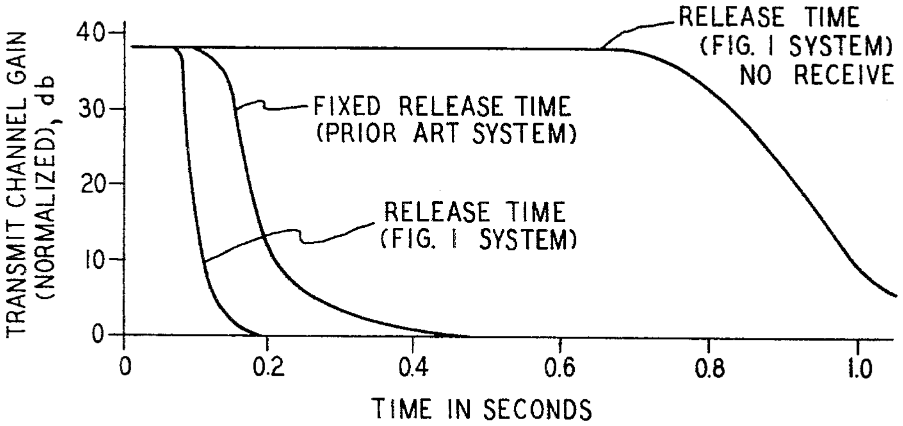
FIG. 4B is a plot of the adaptive release times of the system shown in in FIG. 1 compared to the fixed release time of a prior art system.

A fast attack time is set by the transmit switch 105 in order to avoid initial clipping of the transmit signal. In accordance with the invention the release time, however, is made variable or adaptive which is achieved by the interaction of the transmit and talk-down switches 105 and 106. If there is no receive signal when the transmit signal ceases, the transmit switch 105 provides a relatively slow release time in order to avoid choppiness in transmit speech by holding the system in the transmit mode during short speech pauses. If a receive signal is present when the transmit signal ceases, however, the talk-down switch produces a fast release time in order to avoid initial clipping of the receive speech signal. A plot of attack time and release time of a system in accordance with the invention compared to a prior art system is shown in FIGS. 4A and 4B, respectively.

In accordance with the invention it is the relatively long holdover time of the transmit switch that holds the system in the transmit mode between words and phrases which serves to eliminate the "pumping" action of certain prior art systems that switch partially into and out of the transmit mode with each word or phrase. The reduction in initial clipping that is achieved by the feature of fast release time in the presence of a receive signal makes an important contribution to the overall enhancement in intelligibility that characterizes a system in accordance with the invention. As pointed out above, the employment of a constant release time as opposed to the adaptive release time of the invention can only result in compromises that produce either choppy transmit speech or slow interrupt times.

It is to be understood that the embodiment described herein is merely illustrative of the principles of the invention. Various modifications thereto may be effected by persons skilled in the art without departing from the spirit and scope of the invention.

What is claimed is:

1. In a loudspeaking telephone set, in combination,
an audio loop including a transmit and a receive channel connectable to a telephone line by way of a hybrid, wherein said transmit channel includes a transmit amplifier and wherein said receive channel includes a receive amplifier,
means including a linear adder for combining signals derived from the input and the output of said receive amplifier,
a comparator circuit having a first input for receiving signals derived from speech signals on said transmit channel, a second input for receiving signals derived from noise on said transmit channel, and a third input for receiving signals derived from speech on said receive channel,
means for applying the output of said adder to said third input,
first and second variolosser circuits in said transmit and receive channels, respectively, and
switching means for applying outputs from said comparator circuit to said variolosser circuits thereby to control the operating mode of said set.

2. Apparatus in accordance with claim 1 wherein said second variolosser circuit is connected in the feedback path of said receive amplifier.

3. Apparatus in accordance with claim 1 including first, second and third rectifying means for applying signals to said first, second and third inputs. respectively,
a common control amplifier for amplifying both noise and speech signals derived from said transmit channel and for applying said last named signals so amplified to said first and second rectifying means, and
a switchguard amplifier for amplifying the output of said adder and applying said last named output so amplified to said third input.

4. Apparatus in accordance with claim 3 wherein said common control amplifier and said switchguard amplifier each includes a respective feedback path comprising range expander circuitry.

5. Apparatus in accordance with claim 3 wherein said hybrid comprises an active network including a transistor substantially isolating said receive channel from transmitted speech signals and substantially isolating said transmit channel from received speech signals.

6. In a loudspeaking telephone set, in combination,
an audio loop including a transmit and a receive channel, and
means for switching gain in complementary fashion into said channels,
said means including first and second substantially identical variolossers each connected in a respective one of said channels,
each of said channels further including a respective amplifier,
said variolosser in said receive channel being connected in the feedback network of said amplifier in said receive channel,
control circuitry for applying control signals to said variolossers,
wherein said control circuitry comprises a comparator circuit having a first input point for applying signals thereto derived from speech signals on said transmit channel, a second input point for applying signals thereto derived from noise on said transmit channel and a third input point for applying signals thereto derived from speech signals on said receiver channel,
said comparator circuit generating an output signal at one of two output points as determined by the relative magnitude of signals applied to said input points,
said control circuitry further including a transmit switch for applying signals from one of said output points to one of said variolossers,
a talk-down switch for applying signals from the other of said two output points to the other of said variolossers,
said signals derived from speech signals on said receiver channel being applied to said third input point by way of a linear adder circuit, an amplifier, and a rectifier in series relation,
said receive channel including an amplifier and means connecting both the input and output sides of said amplifier to respective inputs of said linear adder circuit.

* * * * *